(12) United States Patent
Yasumura

(10) Patent No.: US 6,370,041 B2
(45) Date of Patent: Apr. 9, 2002

(54) SWITCHING POWER SUPPLY CIRCUIT FOR GENERATING DC HIGH VOLTAGE

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/901,396

(22) Filed: Jul. 9, 2001

(30) Foreign Application Priority Data

Jul. 11, 2000 (JP) .......................................... P12-215857

(51) Int. Cl.[7] .............................................. H02M 3/335
(52) U.S. Cl. ....................................................... 363/19
(58) Field of Search ............................. 363/18, 19, 97, 363/131

(56) References Cited

U.S. PATENT DOCUMENTS

| | | | | |
|---|---|---|---|---|
| 5,712,772 A | * | 1/1998 | Telefus et al. | ................ 363/21 |
| 5,880,943 A | * | 3/1999 | Yokoyama | ................... 363/56 |
| 5,923,543 A | * | 7/1999 | Choi | ........................... 363/21 |
| 6,205,037 B1 | * | 3/2001 | Fitzgerald, Jr. | ............... 363/21 |
| 6,262,897 B1 | * | 7/2001 | Yasumura | ................ 363/21.02 |

* cited by examiner

Primary Examiner—Adolf Deneke Berhane
(74) Attorney, Agent, or Firm—Jay H. Maioli

(57) ABSTRACT

Instead of inputting a horizontal deflection output pulse, a resonance voltage outputted from the secondary side of an isolation converter transformer forming a switching power supply circuit of the complex resonance type is inputted to the primary side of a flyback transformer via a series resonant capacitor. Then, a resonance voltage having a substantially sinusoidal waveform generated in the primary winding of the flyback transformer is stepped up thereby providing a high direct-current voltage having a specified high voltage level. Thus, it is possible to improve power conversion efficiency and reduce power loss. Also, by inducing a resonance voltage having a substantially sinusoidal waveform on the secondary side of the flyback transformer, the conduction angle of a rectifier diode is widened, and variation in the high direct-current voltage can be surpressed even when the load is varied.

6 Claims, 10 Drawing Sheets

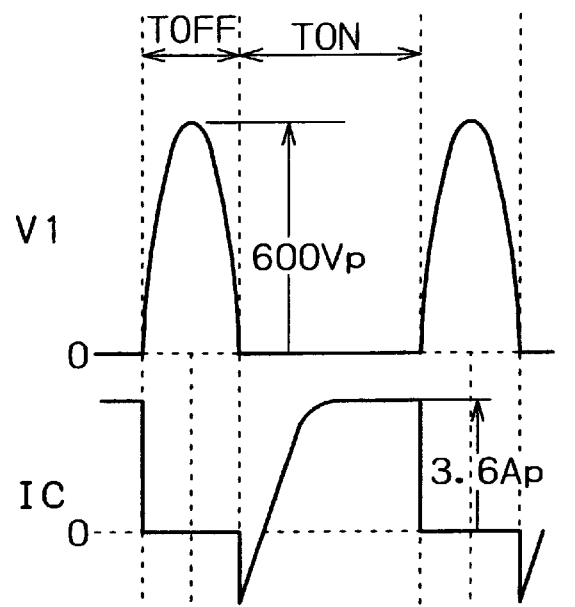
FIG. 2A
FIG. 2B
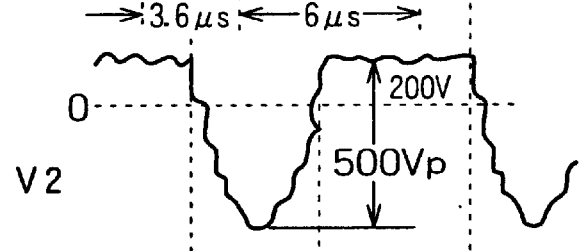
FIG. 2C
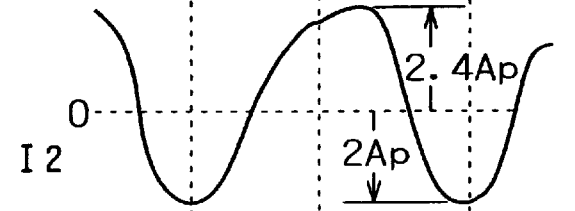
FIG. 2D
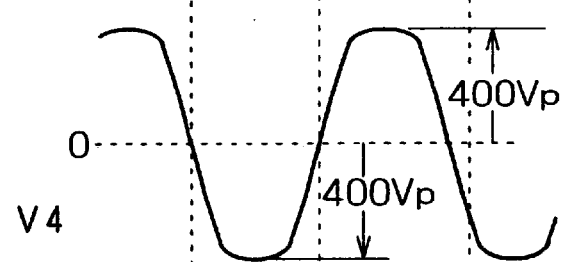
FIG. 2E
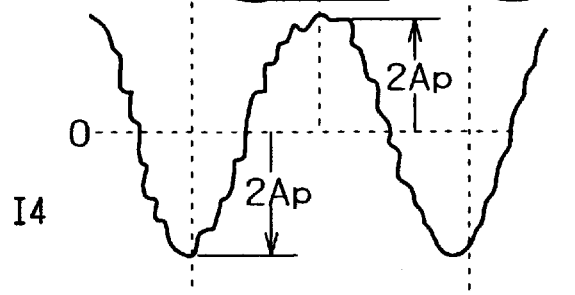
FIG. 2F
Pomax = 60W

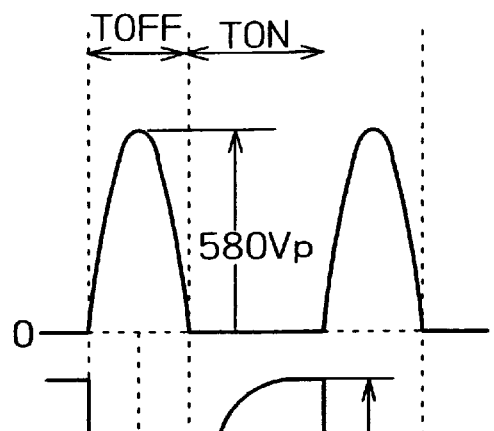
FIG. 2G
FIG. 2H
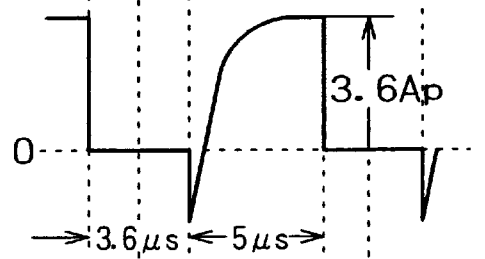
FIG. 2I
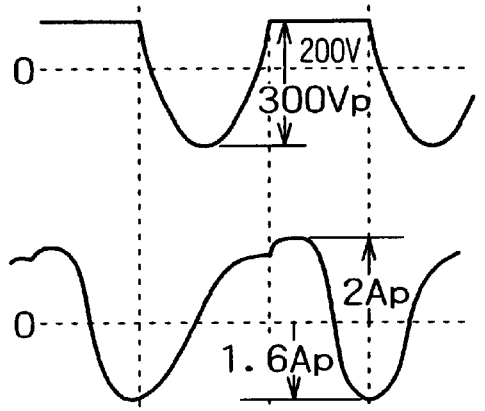
FIG. 2J
FIG. 2K
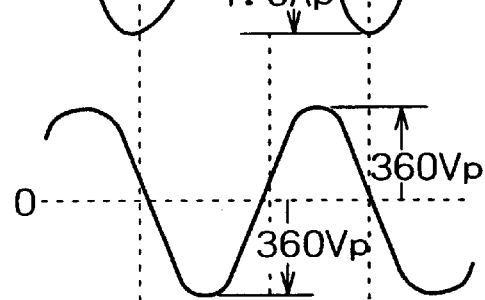
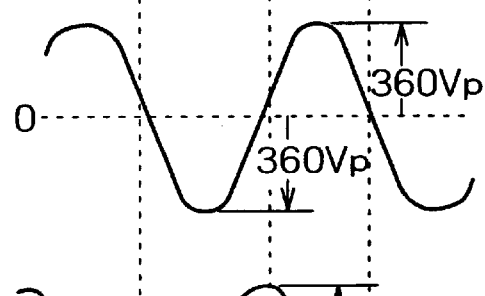
FIG. 2L
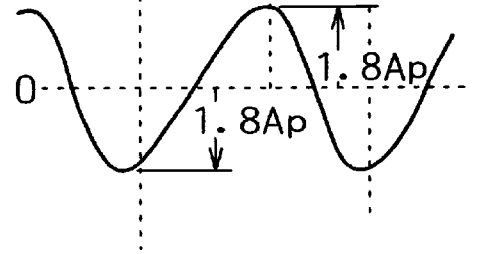
Pomin=0W FIG. 7
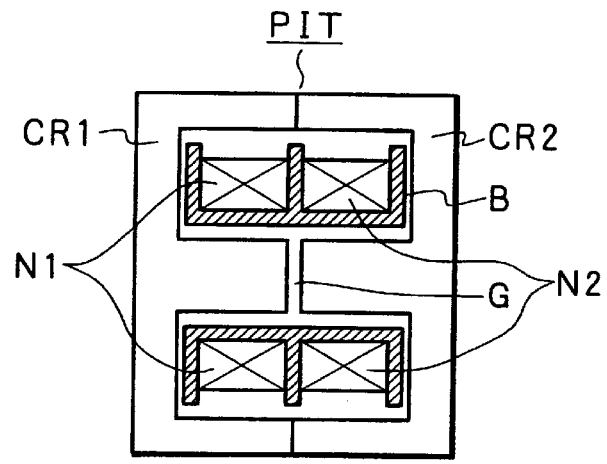
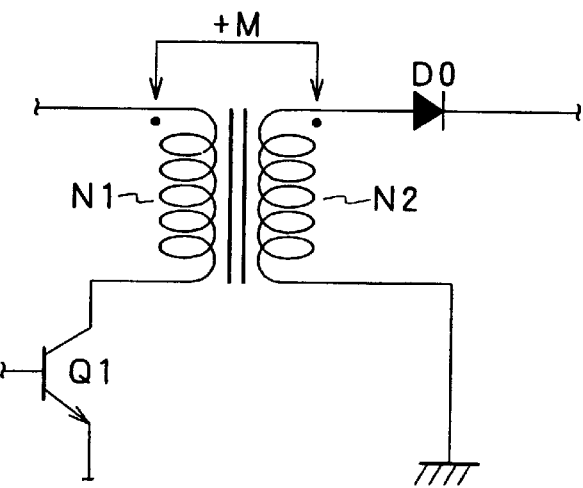
FIG. 8A
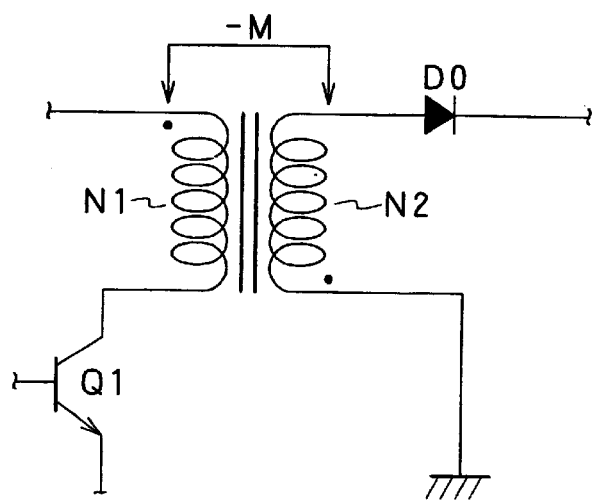
FIG. 8B

SWITCHING POWER SUPPLY CIRCUIT FOR GENERATING DC HIGH VOLTAGE

BACKGROUND OF THE INVENTION

The present invention relates to a switching power supply circuit suitable as a power supply for a television receiver, for example.

A color television receiver having a cathode-ray tube (hereinafter abbreviated to a CRT) for image display, for example, generally uses a power supply circuit formed by a horizontal deflection circuit for deflecting an electron beam emitted from an electron gun within the CRT in a horizontal direction and a switching power supply of the soft switching type formed by a current resonance type converter.

FIG. 9 shows configuration of a horizontal deflection circuit and its peripheral circuit provided in a television receiver.

The switching power supply 10 shown in FIG. 9 is a DC-to-DC converter for performing switching operation on a direct-current voltage inputted thereto and converting the direct-current voltage into a direct-current voltage having a specified voltage level for output.

A rectifying and smoothing circuit is provided before the switching power supply 10. The rectifying and smoothing circuit rectifies and smoothes a commercial alternating-current power VAC to thereby provide a direct-current voltage Ei. The direct-current voltage Ei is then inputted to the switching power supply 10.

The switching power supply 10 outputs a direct-current output voltage E01 converted into a specified voltage level and the like.

In this case, the direct-current output voltage E01 is a voltage for driving the horizontal deflection circuit of the television receiver, and is 135 V, for example.

A horizontal output circuit 20 generates a horizontal deflection current IDY for scanning an electron beam emitted from an electron gun in a CRT in a horizontal direction, and also generates a flyback pulse for generating a high voltage in a high-voltage generating circuit 40, which will be described later.

Thus, a pulse voltage in synchronism with a horizontal synchronizing signal fH of a video signal is inputted from a horizontal driving circuit not shown in the figure to a base of a horizontal output transistor Q11 of the horizontal output circuit 20.

A collector of the horizontal output transistor Q11 is connected to a secondary-side output terminal E01 of the switching power supply 10 via a primary-side winding N11 of a flyback transformer FBT. An emitter of the horizontal output transistor Q11 is grounded.

A damper diode D11, a horizontal flyback line capacitor Cr11, and a series connection circuit formed by a horizontal deflection yoke H·DY, a horizontal line correction coil HLC, and an S-shape correction capacitor CS1 are each connected in parallel with the collector and emitter of the horizontal output transistor Q11.

In the horizontal output circuit 20 thus formed, capacitance of the horizontal flyback line capacitor Cr11 and a leakage inductance component of the primary-side winding N11 of the flyback transformer FBT form a voltage resonance type converter.

The pulse voltage inputted from the horizontal driving circuit not shown in the figure causes the horizontal output transistor Q11 to perform switching operation, whereby a horizontal deflection current IDY having a sawtooth waveform flows through the horizontal deflection yoke H·DY. During the off period of the horizontal output transistor Q11, a relatively high pulse voltage V11 is generated across the horizontal flyback line capacitor Cr11 as a result of resonance operation by inductance LDY of the horizontal deflection yoke H·DY and the capacitance of the horizontal flyback line capacitor Cr11 and the effect of the damper diode D11.

Incidentally, the horizontal line correction coil HLC and the S-shape correction capacitor CS1 correct the horizontal deflection current IDY, for example, to thereby correct distortion of an image displayed on the screen of the CRT.

The high-voltage generating circuit 40 enclosed by alternate long and short dashed lines comprises the flyback transformer FBT and a high-voltage rectifying and smoothing circuit, for example. The high-voltage generating circuit 40 steps up the flyback pulse voltage V11 generated in the horizontal output circuit 20 to thereby generate a high voltage whose level is equivalent to that of an anode voltage of the CRT.

The primary-side winding N11 is wound on the primary side of the flyback transformer FBT, and five step-up windings NHV1, NHV2, NHV3, NHV4, and NHV5 are divided and wound by slit winding or layer winding on the secondary side of the flyback transformer FBT.

Also, tertiary windings N12 and N13 are wound in a state of being closely coupled to the primary-side winding N11 on the primary side of the flyback transformer FBT.

In this case, the step-up windings NHV1 to NHV5 are wound in a winding direction such that the step-up windings NHV1 to NHV5 are of opposite polarity from the primary-side winding N11. The tertiary windings N12 and N13 are wound such that the tertiary windings N12 and N13 are of the same polarity as the primary-side winding N11.

A starting point of the primary-side winding N11 is connected to the secondary-side output terminal E01 of the switching power supply 10, while an ending point of the primary-side winding N11 is connected to the collector of the horizontal output transistor Q11.

Ending points of the step-up windings NHV1 to NHV5 are connected with anodes of high-voltage rectifier diodes DHV1, DHV2, DHV3, DHV4, and DHV5, respectively.

A cathode of the high-voltage rectifier diode DHV1 is connected to a positive terminal of a high-voltage capacitor CHV, and cathodes of the high-voltage rectifier diodes DHV2 to DHV5 are connected to starting points of the step-up windings NHV1 to NHV4, respectively.

Specifically, a half-wave rectifier circuit of the so-called multi-singular type is formed on the secondary side of the flyback transformer FBT by series connection of five half-wave rectifier circuits: the step-up winding NHV1 and the high-voltage rectifier diode DHV1; the step-up winding NHV2 and the high-voltage rectifier diode DHV2; the step-up winding NHV3 and the high-voltage rectifier diode DHV3; the step-up winding NHV4 and the high-voltage rectifier diode DHV4; and the step-up winding NHV5 and the high-voltage rectifier diode DHV5.

Thus, on the secondary side of the flyback transformer FBT, the five half-wave rectifier circuits rectify currents induced in the step-up windings NHV1 to NHV5 and store the resulting currents in the high-voltage capacitor CHV, whereby a high direct-current voltage EHV whose level is equivalent to five times the voltages induced in the step-up windings NHV1 to NHV5 is obtained across the high-voltage capacitor CHV. The high direct-current voltage EHV obtained across the high-voltage capacitor CHV is used as the anode voltage of the CRT, for example.

Incidentally, an induced voltage stepped up to 6 KV is obtained in each of the step-up windings NHV1 to NHV5, and an anode voltage of 30 KV is obtained as the high direct-current voltage EHV.

The primary-side winding N11 of the flyback transformer FBT is provided with a tap. A half-wave rectifying and smoothing circuit formed by a rectifier diode D03 and a smoothing capacitor C03 rectifies and smoothes a positive pulse voltage obtained from the tap to thereby supply a direct-current output voltage E03 from across the smoothing capacitor C03. The direct-current output voltage E03 has a voltage level of 200 V, for example, and is supplied to a cathode of the CRT via a video signal amplifier not shown in the figure.

A rectifying and smoothing circuit formed by a rectifier diode D06 and a smoothing capacitor C06 and a rectifying and smoothing circuit formed by a rectifier diode D07 and a smoothing capacitor C07 rectify and smooth a negative pulse voltage obtained from the tertiary winding N12 wound on the primary side of the flyback transformer FBT, and thereby supply direct-current output voltages E06 and E07 from across the smoothing capacitors C06 and C07, respectively. The direct-current output voltages E06 and E07 have voltage levels of +15 V and −15 V, respectively, and are used as driving voltage of a vertical deflection circuit not shown in the figure.

A rectifying and smoothing circuit formed by a rectifier diode D08 and a smoothing capacitor C08 rectifies and smoothes a negative pulse voltage obtained from the tertiary winding N13 to thereby supply a direct-current output voltage E08 from across the smoothing capacitor C08. The direct-current output voltage E08 is 6.3 V, for example, and is used as voltage for a heater of the CRT.

FIGS. 10A, 10B, 10C, 10D, and 10E show operating waveforms of parts of the circuit shown in FIG. 9.

Since the pulse voltage in synchronism with the horizontal synchronizing signal fH of a video signal is inputted to the base of the horizontal output transistor Q11 in the circuit of FIG. 9, switching frequency of the horizontal output transistor Q11 coincides with frequency of the horizontal synchronizing signal fH. The horizontal output transistor Q11 is turned on during a horizontal scanning period Tt (51.5 μs), and is turned off during a horizontal flyback period Tr (12 μs). Hence, a period TH of 63.5 μs, which is a sum of the horizontal scanning period Tt and the horizontal flyback period Tr, coincides with a cycle of the horizontal synchronizing signal fH.

In this case, as a result of switching operation of the horizontal output transistor Q11, a primary-side current I11 having a waveform as shown in FIG. 10B flows through the primary-side winding N11 of the flyback transformer FBT, and a horizontal deflection current IDY having a waveform as shown in FIG. 10C flows through the horizontal deflection yoke H·DY. A rectified current I3 having a waveform as shown in FIG. 10E flows through the rectifier diode D03 via the tap provided to the primary-side winding N11.

In this case, as shown in FIG. 10A, a voltage V11 across the horizontal flyback line capacitor Cr11 connected in parallel with the collector and emitter of the horizontal output transistor Q11 is at a zero level during the on period Tt of the horizontal output transistor Q11, and forms a flyback pulse voltage V11 of about 1200 Vp, for example, during the off period Tr of the horizontal output transistor Q11 as a result of resonance operation by the inductance component LDY of the horizontal deflection yoke H·DY and the capacitance of the horizontal flyback line capacitor Cr11.

Thus, the high-voltage generating circuit 40 steps up a positive pulse voltage applied to the primary side of the flyback transformer FBT, which results from the flyback pulse voltage V11, whereby different direct-current output voltages having specified voltage levels are obtained from the step-up windings NHV1 to NHV5 on the secondary side and the tertiary windings N12 and N13.

As shown in FIG. 10D, a pulse voltage V3 of about 200 Vp, for example, is generated across the smoothing capacitor C03 during the off period Tr of the horizontal output transistor Q11. The rectifier diode D03 and the smoothing capacitor C03 rectify and smooth the pulse voltage V3 to thereby provide the direct-current output voltage E03.

The flyback transformer FBT of the high-voltage generating circuit 40 in the circuit of FIG. 9 converts the direct-current voltage E01 inputted from the switching power supply 10 into the high direct-current voltage EHV at a power conversion efficiency of about 85%. Therefore, when high-voltage load power is 60 W, for example, a power loss of about 9 W occurs.

In addition, the high-voltage generating circuit 40 subjects peak values of the currents induced in the secondary-side step-up windings NHV1 to NHV5 by the positive pulse voltage inputted to the primary-side winding N11 of the flyback transformer FBT to half-wave rectification, and thereby provides the high direct-current voltage EHV.

In this case, however, conduction angles of the high-voltage rectifier diodes DHV1 to DHV5 are narrow, and equivalent power supply impedance is high. Therefore, the voltage level of the high direct-current voltage EHV is easily affected by variation in the high-voltage load.

When the circuit is applied to a television receiver having a CRT screen size of 34 inches or more, highlighting at the highest brightness on the screen of the CRT requires a beam current IHV of 2 mA or more to be supplied to the anode of the CRT, for example. Hence, when it is supposed that the high direct-current voltage EHV supplied to the anode has a voltage level of 30 KV, for example, a power of 60 W (30 KV×2 mA) is required as the high-voltage load power to be applied to the high-voltage generating circuit 40 during highlighting.

Thus, the high-voltage load power supplied from the high-voltage generating circuit 40 to the anode of the CRT may be considered to be varied at least from 0 W (IHV=0 mA) to 60 W (IHV=2 mA).

In this case, when it is supposed that the beam current IHV of 2 mA flows through the anode of the CRT and the high direct-current voltage EHV has a voltage level of 30 KV when the high-voltage load power of the high-voltage generating circuit 40 is 60 W, the high direct-current voltage EHV raises its voltage level to 32.5 KV, for example, under load conditions where the high-voltage load power of the high-voltage generating circuit 40 is 0 W. Thus, when the circuit is applied to an actual television receiver or the like, a voltage variation range ΔEHV of the high direct-current voltage EHV within an actually employed range of the high-voltage load power (0 W to 60 W) is about 2.5 KV. This results from a voltage drop at the high-voltage rectifier diodes DHV1 to DHV5 forming the high-voltage generating circuit 40 due to variation in the high-voltage load power applied to the high-voltage generating circuit 40.

When the horizontal deflection current IDY has a constant current value, for example, such variation in the voltage level of the high direct-current voltage EHV results in a change in horizontal amplitude of the electron beam outputted from the CRT. Therefore, the horizontal output circuit 20 in an actual television receiver needs to be provided with a zooming correction circuit and the like for correcting the current value of the horizontal deflection current IDY so that the variation in the high direct-current voltage EHV will not change the horizontal amplitude of the electron beam.

Moreover, because of its structure, for example leakage inductance of the secondary-side step-up windings NHV1 to NHV5, the flyback transformer FBT causes ringing in timing in which the level of the voltage induced in the step-up windings NHV1 to NHV5 becomes negative.

When the ringing component is superimposed on the primary-side current I11 shown in FIG. 10B, which flows through the primary side of the flyback transformer FBT, raster ringing, a curtain pattern and the like are produced on the left edge of the screen of the CRT.

Therefore, an actual television receiver needs to be provided with some measures to prevent the raster ringing and the curtain pattern.

SUMMARY OF THE INVENTION

It is thus an object of the present invention addressing the problems described above to provide a switching power supply circuit for rendering a high direct-current voltage outputted from a flyback transformer constant.

To achieve the above object, according to an aspect of the present invention, there is provided a switching power supply circuit comprising: switching means including a switching device for interrupting a direct-current input voltage inputted thereto for output; an isolation converter transformer for transmitting an output on a primary side thereof to a secondary side thereof, the isolation converter transformer including a primary-side winding wound on the primary side and a secondary-side winding wound on the secondary side, and the isolation converter transformer having a desired degree of coupling to loosely couple the primary-side winding and the secondary-side winding to each other; a primary-side parallel resonant circuit formed by connecting a primary-side parallel resonant capacitor in parallel with the primary-side winding of the isolation converter transformer for converting operation of the switching means into voltage resonance type operation; a secondary-side parallel resonant circuit formed by connecting a secondary-side parallel resonant capacitor in parallel to the secondary-side winding; a step-up transformer for transmitting a resonance voltage inputted to a primary side thereof to a secondary side thereof and thereby supplying from the secondary side a stepped-up voltage obtained by stepping up the resonance voltage, the step-up transformer including a primary-side winding wound on the primary side and a secondary-side winding wound on the secondary side; a series resonant capacitor inserted between the secondary-side winding of the isolation converter transformer and the primary-side winding of the step-up transformer for converting primary-side operation of the step-up transformer into resonance operation, the series resonant capacitor inputting the resonance voltage obtained from the secondary-side winding of the isolation converter transformer to the primary side of the step-up transformer; and high direct-current voltage generating means for performing rectifying operation on the stepped-up voltage obtained on the secondary side of the step-up transformer and thereby providing a high direct-current voltage.

With this configuration, the negative resonance voltage outputted from the secondary side of the isolation converter transformer forming the switching power supply circuit of the complex resonance type is inputted to the primary side of the step-up transformer via the series resonant capacitor. Therefore, it is possible to obtain the high direct-current voltage necessary for horizontal deflection of a television receiver, for example, without intervention of a horizontal deflection circuit system. Furthermore, in this case, it is possible to render the waveform of the resonance voltage inputted to the primary side of the step-up transformer substantially sinusoidal.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A, 2B, 2C, 2D, 2E, 2F, 2G, 2H, 2I, 2J, 2K, and 2L are waveform diagrams showing operations of main parts of the power supply circuit shown in FIG. 1;

FIG. 7 is a sectional view of an isolation converter transformer;

FIGS. 8A and 8B are diagrams of assistance in explaining operations when mutual inductance is +M and −M;

DETAILED DESCRIPTION OF THE INVENTION

Figure 1:
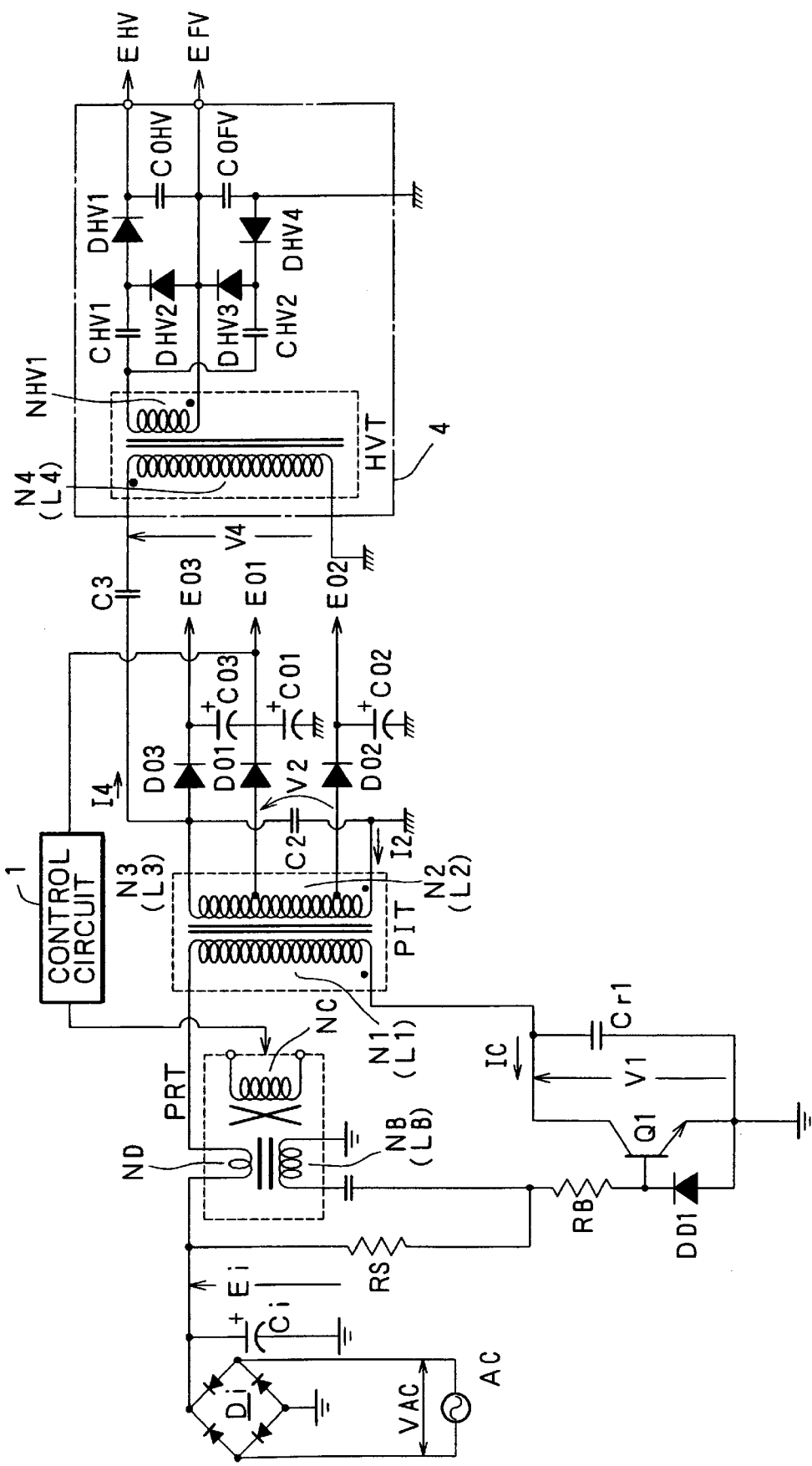
FIG. 1 shows a configuration of a power supply circuit according to a first embodiment of the present invention.

FIG. 1 is a circuit diagram showing a configuration of a switching power supply circuit according to an embodiment of the present invention.

The power supply circuit has a configuration of a complex resonance type switching converter provided with a voltage resonance type converter on the primary side and a parallel resonant circuit on the secondary side.

The power supply circuit is provided with a full-wave rectifying and smoothing circuit that comprises a bridge rectifier circuit Di and a smoothing capacitor Ci and is supplied with a commercial alternating-current power VAC to provide a direct-current input voltage. The full-wave rectifying and smoothing circuit generates a rectified and smoothed voltage Ei whose level is equal to that of the alternating input voltage VAC.

The voltage resonance type converter that includes a switching device Q1 and performs self-excited switching operation by a so-called single-ended system is provided as a switching converter for interrupting the direct-current input voltage Ei inputted from the rectifying and smoothing circuit In this case, a high voltage bipolar transistor (bipolar junction transistor) is employed as the switching device Q1.

A base of the switching device Q1 is connected to the positive electrode side of the smoothing capacitor Ci via a current limiting resistance RB and a starting resistance RS. An emitter of the switching device Q1 is connected to a primary-side ground.

Connected between the base of the switching device Q1 and the primary-side ground is a series resonant circuit for self-oscillation driving that is formed by connecting a driving winding NB, a resonant capacitor CB, and the base current limiting resistance RB in series with each other. A clamp diode DD1 inserted between the base of the switching device Q1 and a negative electrode of the smoothing capacitor Ci forms a path of a clamp current that flows during an off period of the switching device Q1.

A collector of the switching device Q1 is connected to one end of a primary-side winding N1 formed on the primary side of an isolation converter transformer PIT, while the emitter of the switching device Q1 is grounded.

A parallel resonant capacitor Cr1 is connected in parallel with the collector and emitter of the switching device Q1. Capacitance of the parallel resonant capacitor Cr1 and leakage inductance L1 of the primary-side winding N1 form a primary-side parallel resonant circuit of the voltage resonance type converter. During the off period of the switching device Q1, a voltage V1 generated across the resonant capacitor Cr1 by the effect of the primary-side parallel resonant circuit practically forms a sinusoidal pulse waveform, and thus a voltage resonance type operation is obtained.

An orthogonal type control transformer PRT is a saturable reactor provided with a resonance current detecting winding ND, the driving winding NB, and a control winding NC. The orthogonal type control transformer PRT is provided to drive the switching device Q1 and effect control for constant voltage.

The structure of the orthogonal type control transformer PRT is a cubic core, not shown, formed by connecting two double-U-shaped cores each having four magnetic legs with each other at ends of the magnetic legs. The resonance current detecting winding ND and the driving winding NB are wound around two given magnetic legs of the cubic core in the same winding direction, and the control winding NC is wound in a direction orthogonal to the resonance current detecting winding ND and the driving winding NB.

In this case, the resonance current detecting winding ND of the orthogonal type control transformer PRT is inserted in series between the positive electrode of the smoothing capacitor Ci and the primary-side winding N1, so that the switching output of the switching device Q1 is transmitted to the resonance current detecting winding ND via the primary-side winding N1.

The switching output obtained by the resonance current detecting winding ND of the orthogonal type control transformer PRT is induced in the driving winding NB via transformer coupling, whereby an alternating voltage is generated as driving voltage in the driving winding NB. The driving voltage is outputted as driving current from a series resonant circuit NB and CB, which forms the self-oscillation driving circuit, to the base of the switching device Q1 via the base current limiting resistance RB.

Thus, the switching device Q1 performs switching operation at a switching frequency determined by the resonance frequency of the series resonant circuit.

The isolation converter transformer PIT (Power Isolation Transformer) transmits the switching output of the switching device Q1 to the secondary side of the switching power supply circuit.

As shown in FIG. 7, the isolation converter transformer PIT has an E-E-shaped core formed by combining E-shaped cores CR1 and CR2 made for example of a ferrite material in such a manner that magnetic legs of the core CR1 are opposed to magnetic legs of the core CR2. The primary-side winding N1 and a secondary-side winding N2 are wound around a central magnetic leg of the E-E-shaped core in a state of being divided from each other by a dividing bobbin B. Also, a gap G is formed in the central magnetic leg, as shown in FIG. 7. Thus, loose coupling at a desired coupling coefficient (for example 0.85) is provided, and because of the low coupling coefficient, a saturated state is not readily obtained.

The gap G can be formed by making the central magnetic leg of each of the E-shaped cores CR1 and CR2 shorter than two outer magnetic legs of each of the E-shaped cores CR1 and CR2.

As for secondary-side operation of the isolation converter transformer PIT, mutual inductance M between the inductance L1 of the primary-side winding N1 and inductance L2 of the secondary-side winding N2 provides +M operation mode (additive polarity mode; forward operation) or −M operation mode (subtractive polarity mode; flyback operation), depending on polarity (winding direction) of the primary-side winding N1 and the secondary-side winding N2, a connecting relation of a rectifier diode D0, and change in polarity of the alternating voltage induced in the secondary-side winding. For example, an equivalent of a circuit shown in FIG. 8A has a mutual inductance of +M, while an equivalent of a circuit shown in FIG. 8B has a mutual inductance of −M.

During a period in +M operation mode provided by the polarity of the primary-side winding N1 and the secondary-side winding N2 and N3 of the isolation converter transformer PIT, the power supply circuit shown in FIG. 1 charges smoothing capacitors C01 and C03 via rectifier diodes D01 and D03.

As shown in FIG. 1, the starting point of the primary-side winding N1 of the isolation converter transformer PIT is connected to the collector of the switching device Q1, whereas the ending point of the primary-side winding N1 is connected to the positive electrode of the smoothing capacitor Ci via the resonance current detecting winding ND, which is connected in series with the positive electrode of the smoothing capacitor Ci.

The isolation converter transformer PIT is provided on the secondary side with a secondary winding N2, or a first secondary-side winding, and a tertiary winding N3 or a second secondary-side winding formed by winding a wire from the ending point of the secondary winding N2. A secondary-side parallel resonant capacitor C2 is connected in parallel with the secondary-side winding (N2+N3) formed by the secondary winding N2 and the tertiary winding N3.

In this case, a starting point of the secondary winding N2 is connected to a secondary-side ground, whereas an ending point of the secondary winding N2 is connected to an anode of the rectifier diode D01. A half-wave rectifying and smoothing circuit formed by the rectifier diode D01 and the smoothing capacitor C01 provides a direct-current output voltage E01 of 100 V to 140 V for horizontal deflection, for example.

A tap is provided at a desired position of the secondary winding N2, and an anode of a rectifier diode D02 is connected to the tap. A half-wave rectifying and smoothing circuit formed by the rectifier diode D02 and a smoothing capacitor C02 provides a direct-current output voltage E02 (15 V) for a signal circuit.

Further, on the secondary side of the isolation converter transformer PIT, an ending point of the tertiary winding N3 formed by winding a wire of the secondary winding N2 is connected to an anode of the rectifier diode D03. Thus, a half-wave rectifier circuit formed by the rectifier diode D03 and the smoothing capacitor C03 provides a direct-current output voltage E03 (200 V) for a video output circuit. In the present power supply circuit, the negative electrode side of the smoothing capacitor C03 is connected to the positive electrode side of the smoothing capacitor C01, whereby the direct-current output voltage E03 for a video output circuit is obtained from across a series connection circuit of the smoothing capacitors C01 and C03.

More specifically, in order to obtain the direct-current output voltage E03 for a video output circuit, the direct-current output voltage generated across the smoothing capacitor C03 is accumulated on the direct-current output voltage E01 generated across the smoothing capacitor C01; that is, the direct-current output voltage E03 is obtained by superimposing the direct-current output voltage obtained from the tertiary winding N3 on the direct-current output voltage E01 obtained from the secondary winding N2.

Thus, it suffices for the rectifying and smoothing circuit formed by the tertiary winding N3, the rectifier diode D03, and the smoothing capacitor C03 to provide a direct-current output voltage of 60 V to 90 V, which results from subtraction of the direct-current output voltage E01 (110 V to 140 V) from the direct-current output voltage E03 (200 V).

In this case, a secondary-side parallel resonant capacitor C2 is connected in parallel with the secondary-side winding (N2+N3) formed by the secondary winding N2 and the tertiary winding N3. Thus, leakage inductance (L2+L3) of the secondary-side winding (N2+N3) and capacitance of the secondary-side parallel resonant capacitor C2 form a secondary-side parallel resonant circuit. The secondary-side parallel resonant circuit converts an alternating voltage induced in the secondary winding N2 and the tertiary winding N3 into a resonance voltage, whereby a voltage resonance operation is obtained on the secondary side of the isolation converter transformer PIT.

Thus, the present power supply circuit is provided with the parallel resonant circuit to convert switching operation into voltage resonance type operation on the primary side and the parallel resonant circuit to provide voltage resonance operation on the secondary side. In the present specification, the switching converter provided with such resonant circuits on the primary side and the secondary side is also referred to as a "complex resonance type switching converter".

Such a configuration of the complex resonance type switching converter can be realized because the gap G is formed in the isolation converter transformer PIT to provide loose coupling at a desired coupling coefficient and thereby a saturated state is not readily obtained, as described with reference to FIG. 7. For example, when the gap G is not provided in the isolation converter transformer PIT, it is highly likely that the isolation converter transformer PIT reaches a saturation state in flyback operation and performs abnormal operation. Therefore it is difficult to expect that rectifying operation on the secondary side will be properly performed.

The direct-current output voltage E01 is also inputted from a branch point to a control circuit 1.

The control circuit 1 variably controls the inductance LB of the driving winding NB wound in the orthogonal type control transformer PRT by changing the level of a control current flowing through the control winding NC of the orthogonal type control transformer PRT according to change in the level of the secondary-side direct-current output voltage E01. This results in a change in resonance conditions of the series resonant circuit including the inductance LB of the driving winding NB in the circuit for self-oscillation driving of the switching device Q1. This represents an operation of changing the switching frequency of the switching device Q1, by which the direct-current output voltage outputted from the secondary side of the isolation converter transformer PIT is stabilized.

Incidentally, the direct-current output voltage E03 may be inputted from a branch point to the control circuit 1 to render the direct-current output voltage stable.

In a case where the orthogonal type control transformer PRT variably controlling the inductance LB of the driving winding NB is provided as in the present power supply circuit, when the switching frequency of the switching device Q1 is changed, a period TOFF during which the switching device Q1 is turned off is fixed, while a period TON in which the switching device Q1 is turned on is variably controlled. Specifically, it may be considered that by variably controlling the switching frequency of the switching device Q1 as an operation for constant-voltage control, the present power supply circuit controls resonance impedance for switching output, and at the same time, effects PWM control of the switching device Q1 within a switching cycle. This complex control operation is realized by a single control circuit system. In the present specification, such complex control is also referred to as a "complex control method".

The ending point of the tertiary winding N3 is also connected via a series resonant capacitor C3 to a starting point of a primary-side winding N4 of a flyback transformer FBT provided in a high-voltage generating circuit 4.

More specifically, the secondary-side winding (N2+N3) of the isolation converter transformer PIT and a series connection circuit of the series resonant capacitor C3 and the primary-side winding N4 of the flyback transformer FBT are each connected in parallel with the secondary-side parallel resonant capacitor C2.

The isolation converter transformer PIT in the thus configured power supply circuit operates as a complex resonance type switching converter, whereby a resonance pulse voltage is generated across the secondary-side parallel resonant capacitor C2.

The direct-current output voltage E03 is obtained from a positive resonance pulse voltage generated during a positive period in which the isolation converter transformer PIT is in forward operation, while a negative resonance pulse voltage generated during a negative period in which the isolation converter transformer PIT is in flyback operation is inputted to the primary-side winding N4 of the flyback transformer FBT via the series resonant capacitor C3.

In this case, a current resonant circuit formed by a series connection circuit of capacitance of the series resonant capacitor C3 and inductance of the primary-side winding N4 is provided on the primary side of the flyback transformer FBT. Thus, a resonance current I4 having a substantially sinusoidal waveform flows through the primary-side winding N4 of the flyback transformer FBT, and a voltage V4 across the primary-side winding N4 is also a resonance voltage having a substantially sinusoidal waveform.

The high-voltage generating circuit 4 enclosed by alternate long and short broken lines is formed by a step-up transformer HVT and a high-voltage rectifier circuit. The high-voltage generating circuit 4 steps up the resonance voltage V4 generated in the primary-side winding N4 of the step-up transformer HVT to thereby generate a high voltage whose level is equivalent to that of an anode voltage of a CRT, for example.

In order to obtain the high voltage, a step-up winding NHV1, for example, is divided and wound by slit winding or layer winding on the secondary side of the step-up transformer HVT.

Also in this case, the primary-side winding N4 is wound in a direction opposite to the step-up winding NHV1, and a voltage stepped up by a turns ratio between the step-up winding NHV1 and the primary-side winding N4 (NHV1/N4) is obtained on the secondary side of the step-up transformer HVT.

Figure 3A:
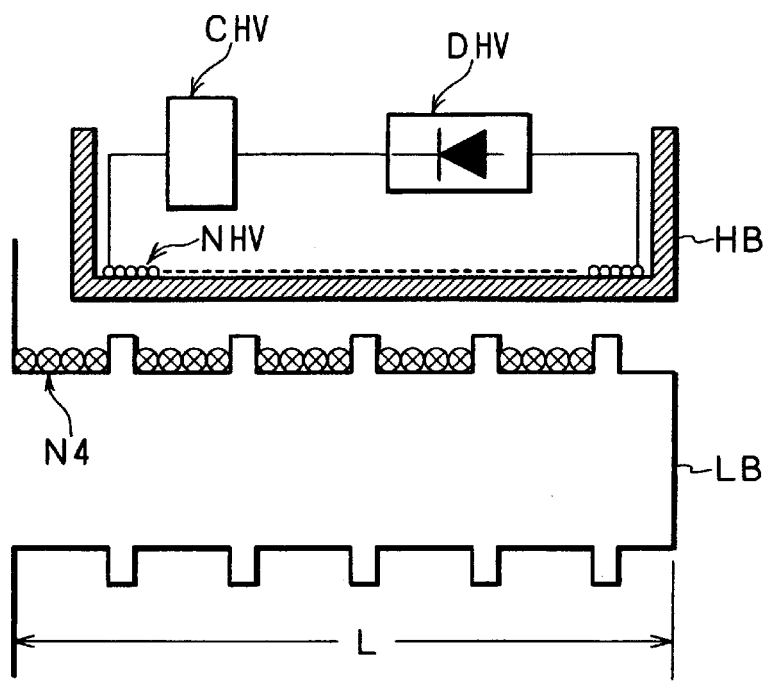
FIGS. 3A and 3B are schematic sectional views of structure of a step-up transformer HVT provided in the power supply circuit shown in FIG. 1.
Figure 3B:
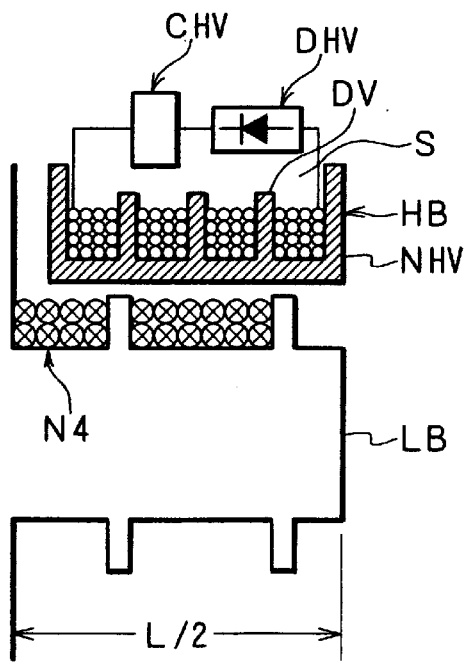

FIGS. 3A and 3B schematically show structure of the step-up transformer HVT.

FIG. 3A shows a case in which a step-up winding NHV of the step-up transformer HVT is wound by alignment winding. In this case, the primary-side winding N4 is wound around a low-voltage winding bobbin LB, and a step-up winding NHV1 is wound around a high-voltage winding bobbin HB in an aligned state. Incidentally, a litz wire formed by bundling a plurality of solid wires is used as the primary-side winding N4 wound around the low-voltage winding bobbin LB, and a fine wire (solid wire) 30 $\mu$m to 60 $\mu$m in diameter, for example, is used as the step-up winding NHV.

Thus, when the step-up transformer HVT is formed by alignment winding, it suffices to wind the single-layer step-up winding NHV around the high-voltage winding bobbin HB, as shown in FIG. 3A. This eliminates the need for interlayer film inserted between the step-up windings NHV1 to NHV5 to wind the five step-up windings NHV1 to NHV5 around the high-voltage winding bobbin HB in layers in the flyback transformer FBT shown in FIG. 9, for example.

FIG. 3B shows so-called division winding (slit winding) in which the step-up winding NHV is divided and wound around a high-voltage winding bobbin divided into a plurality of regions.

When the step-up winding NHV is wound by division winding, slits S or the plurality of winding regions are formed by dividers DV provided integrally with the inside of the high-voltage winding bobbin HB, as shown in FIG. 3B. Step-up windings NHV are wound in the slits S, whereby insulation between the step-up windings NHV is obtained. Also in this case, a litz wire formed by bundling a plurality of solid wires is used as the primary-side winding N4 wound around the low-voltage winding bobbin LB, and a fine wire is used as the step-up winding NHV.

When the step-up transformer HVT is thus formed by division winding, length of the high-voltage winding bobbin HB and the low-voltage winding bobbin LB can be reduced to about ½ of that of the alignment winding shown in FIG. 3A, thereby making it possible to miniaturize the step-up transformer HVT as much.

It is to be noted that FIGS. 3A and 3B show only one section of the high-voltage winding bobbin HB; of course, however, a similar section of the high-voltage winding bobbin HB is disposed in practice on the opposite side of the low-voltage winding bobbin LB.

Also, though not shown, one magnetic leg of a square core (ferrite core) is attached to the low-voltage winding bobbin LB and the high-voltage winding bobbin HB. The square core comprises two U-shaped cores, for example, and is formed by providing a gap in a portion where an end of one U-shaped core is opposed to an end of the other U-shaped core and by combining the cores with each other in such a manner that magnetic legs of one core are opposed to magnetic legs of the other core.

In the present power supply circuit, one step-up winding NHV1 is wound on the secondary side of the step-up transformer HVT. An ending point of the step-up winding NHV1 is connected to a node that connects an anode of a high-voltage rectifier diode DHV1 with a cathode of a rectifier diode DHV2 via a high-voltage capacitor CHV1 formed for example by a film capacitor or a ceramic capacitor. The ending point of the step-up winding NHV1 is also connected to a node connecting an anode of a high-voltage rectifier diode DHV3 with a cathode of a high-voltage rectifier diode DHV4 via a high-voltage capacitor CHV2 connected in series with the node.

A starting point of the step-up winding NHV1 is connected to a node connecting a negative electrode of a smoothing capacitor COHV with a positive electrode of a smoothing capacitor COFV. The node connecting the negative electrode of the smoothing capacitor COHV with the positive electrode of the smoothing capacitor COFV is connected with an anode of the high-voltage rectifier diode DHV2 and a cathode of the high-voltage rectifier diode DHV3.

The negative electrode of the smoothing capacitor COHV and the positive electrode of the smoothing capacitor COFV are connected in series with each other. A positive electrode of the smoothing capacitor COHV is connected to a cathode of the high-voltage rectifier diode DHV1, and a negative electrode of the smoothing capacitor COFV is connected to a secondary-side ground.

As a result, such a connection forms a first voltage doubler rectifier circuit comprising a set of the high-voltage capacitor CHV1, the high-voltage rectifier diodes DHV1 and DHV2, and the smoothing capacitor COHV and a second voltage doubler rectifier circuit comprising a set of the high-voltage capacitor CHV2, the rectifier diodes DHV3 and DHV4, and the smoothing capacitor COFV. Outputs of the first and second voltage doubler rectifier circuits are connected in series with each other. A rectifier circuit as a whole formed by combining the first and second voltage doubler rectifier circuits provides a secondary-side output voltage equivalent to four times the alternating voltage of the step-up winding NHV1 across the series connection of the smoothing capacitor COHV and the smoothing capacitor COFV. This means that the rectifier circuit as a whole formed by combining the first and second voltage doubler rectifier circuits forms a voltage quadrupler full-wave rectifier circuit.

Operation of the voltage quadrupler full-wave rectifier circuit is as follows. When switching output is obtained at the primary-side winding N4 as a result of switching operation on the primary side of the step-up transformer HVT, the switching output is induced at the step-up winding NHV1. The voltage quadrupler rectifier circuit is supplied with the alternating voltage obtained in the step-up winding NHV1, and then performs rectifying operation on the alternating voltage. Operation at this point of the first voltage doubler rectifier circuit comprising the high-voltage capacitor CHV1, the high-voltage rectifier diodes DHV1 and DHV2, and the smoothing capacitor COHV will be described in the following.

First, during a period in which the rectifier diode DHV1 is turned off and the rectifier diode DHV2 is turned on, the voltage doubler rectifier circuit operates to store a current rectified by the high-voltage rectifier diode DHV2 in the series resonant capacitor CHV1.

During a rectifying operation period in which the rectifier diode DHV2 is turned off and the rectifier diode DHV1 is turned on, the voltage doubler rectifier circuit operates to add potential of the high-voltage capacitor CHV1 to the voltage induced in the step-up winding NHV1. A direct-current voltage substantially equivalent to twice the induced voltage of the step-up winding NHV1 is obtained across the smoothing capacitor COHV.

The second voltage doubler rectifier circuit comprising the high-voltage capacitor CHV2, the high-voltage rectifier diodes DHV3 and DHV4, and the smoothing capacitor COFV operates in a similar manner, whereby a direct-current voltage substantially equivalent to twice the induced voltage of the step-up winding NHV1 is obtained across the smoothing capacitor COFV.

As a result of the above-described operation of each of the first and second voltage doubler rectifier circuits, a secondary-side direct-current output voltage EHV substantially equivalent to four times the induced voltage of the step-up winding NHV1 is obtained across the series connection of the smoothing capacitor COHV and the smoothing capacitor COFV. The high direct-current voltage EHV obtained across the series connection of the smoothing capacitor COHV and the smoothing capacitor COFV is used as an anode voltage of a CRT.

In this case, a high direct-current voltage EFV obtained across the smoothing capacitor COFV is outputted as a focus voltage to for example a fourth grid of the CRT.

When configuring an actual circuit so as to obtain a high direct-current voltage EHV of 30 KV, for example, from the high-voltage generating circuit 4, the following selection is made: the secondary winding N2 of the isolation converter transformer PIT=45 T; the tertiary winding N3=22 T; the secondary-side parallel resonant capacitor C2=2200 PF; the series resonant capacitor C3=3900 PF; the primary-side winding N4 of the step-up transformer HVT=28 T; the step-up winding NHV1=530 T; the high-voltage capacitor CHV1 or CHV2=100 PF; and the smoothing capacitor CHV or CFV=1000 PF.

FIGS. 2A to 2L show operating waveforms of the power supply circuit shown in FIG. 1. FIGS. 2A to 2F show operating waveforms under conditions where, for example, an alternating input voltage VAC is 100 V and high-voltage load power of the high-voltage generating circuit 4 is at a maximum load power Pomax=60 W (IHV=2 mA). FIGS. 2G to 2L show operating waveforms under conditions where the high-voltage load power of the high-voltage generating circuit 4 is at a minimum load power Pomin=0 W (IHV=0 mA), for example.

When the high-voltage load power of the high-voltage generating circuit 4 is at the maximum load power, the switching frequency of the switching device Q1 is controlled to 104 kHz, for example, and the actual on/off period TON/TOFF of the switching device Q1 is 6 μs/3 μs.

As shown in FIG. 2A, a resonance voltage V1 generated across the parallel resonant capacitor Cr1 by the on/off operation of the switching device Q1 forms a sinusoidal pulse waveform during the period TOFF in which the switching device Q1 is turned off. Thus, the operation of the switching converter is of the voltage resonance type.

In this case, a collector current IC as shown in FIG. 2B flows through the switching device Q1. For example, during the turn-on period of the switching device Q1, a damper current (negative direction) flows to the primary-side winding N1 via the clamp diode DD1 and the base and collector of the switching device Q1. After a damper period in which the damper current flows is ended, the collector current IC steeply rises from a negative level to a positive level.

As a result of such operation, a resonance current I2 as shown in FIG. 2D flows through the secondary-side winding (N2+N3) of the isolation converter transformer PIT. As shown in FIG. 2C, a voltage V2 generated across the secondary-side parallel resonant capacitor C2 has a positive voltage level of 200 V during the on period of the switching device Q1 as a result of operation of the rectifier diodes D01 and D03, and the voltage V2 becomes a negative resonance pulse voltage having a peak voltage level of 500 Vp during the off period TOFF of the switching device Q1.

The negative resonance pulse voltage generated across the secondary-side resonant capacitor C2 is inputted to the primary-side winding N4 of the step-up transformer HVT via the series resonant capacitor C3, which forms a series resonant circuit in conjunction with the primary-side winding N4. Thus, as shown in FIG. 2E, a resonance voltage V4 generated across the primary-side winding N4 forms a resonance voltage waveform having a peak voltage level of 400 Vp, while as shown in FIG. 2F, a resonance current I4 flowing through the primary-side winding N4 forms a resonance current waveform having a peak value of 2 Ap.

On the other hand, when the high-voltage load power of the high-voltage generating circuit 4 is at the minimum load power (no load), the switching frequency of the switching device Q1 is controlled to 116 kHz, for example, and the actual on/off period TON/TOFF of the switching device Q1 is 5 μs/3.6 μs.

In this case, as shown in FIG. 2G, the resonance voltage V1 generated across the parallel resonant capacitor Cr1 by the on/off operation of the switching device Q1 forms a sinusoidal pulse waveform during the period TOFF in which the switching device Q1 is turned off.

As a result of such operation, the resonance current I2 as shown in FIG. 2J flows through the secondary-side winding (N2+N3) of the isolation converter transformer PIT. The voltage V2 generated across the secondary-side parallel resonant capacitor C2 is as shown in FIG. 2I.

The negative resonance pulse generated across the secondary-side resonant capacitor C2 is inputted to the primary-side winding N4 of the step-up transformer HVT via the series resonant capacitor C3. Thus, the voltage V4 across the primary-side winding N4 forms a resonance waveform as shown in FIG. 2K, while the current I4 flowing through the primary-side winding N4 forms a resonance waveform as shown in FIG. 2L.

As shown by comparison of the operating waveforms shown in FIGS. 2A to 2F with those shown in FIGS. 2G to 2L, the power supply circuit of FIG. 1 changes the switching frequency of the switching device Q1 from 104 kHz to 116 kHz as the high-voltage load power of the high-voltage generating circuit 4 varies from the maximum load power Pomax to the minimum load power Pomin.

Thus, the power supply circuit of FIG. 1 variably controls the switching frequency of the primary-side switching converter according to variation in the high-voltage load of the high-voltage generating circuit 4. This means that an alternating voltage cycle of the step-up transformer HVT, that is, switching frequency of the rectifier diodes in the high-voltage generating circuit 4 is changed depending on the switching frequency of the primary-side switching converter.

Figure 9:
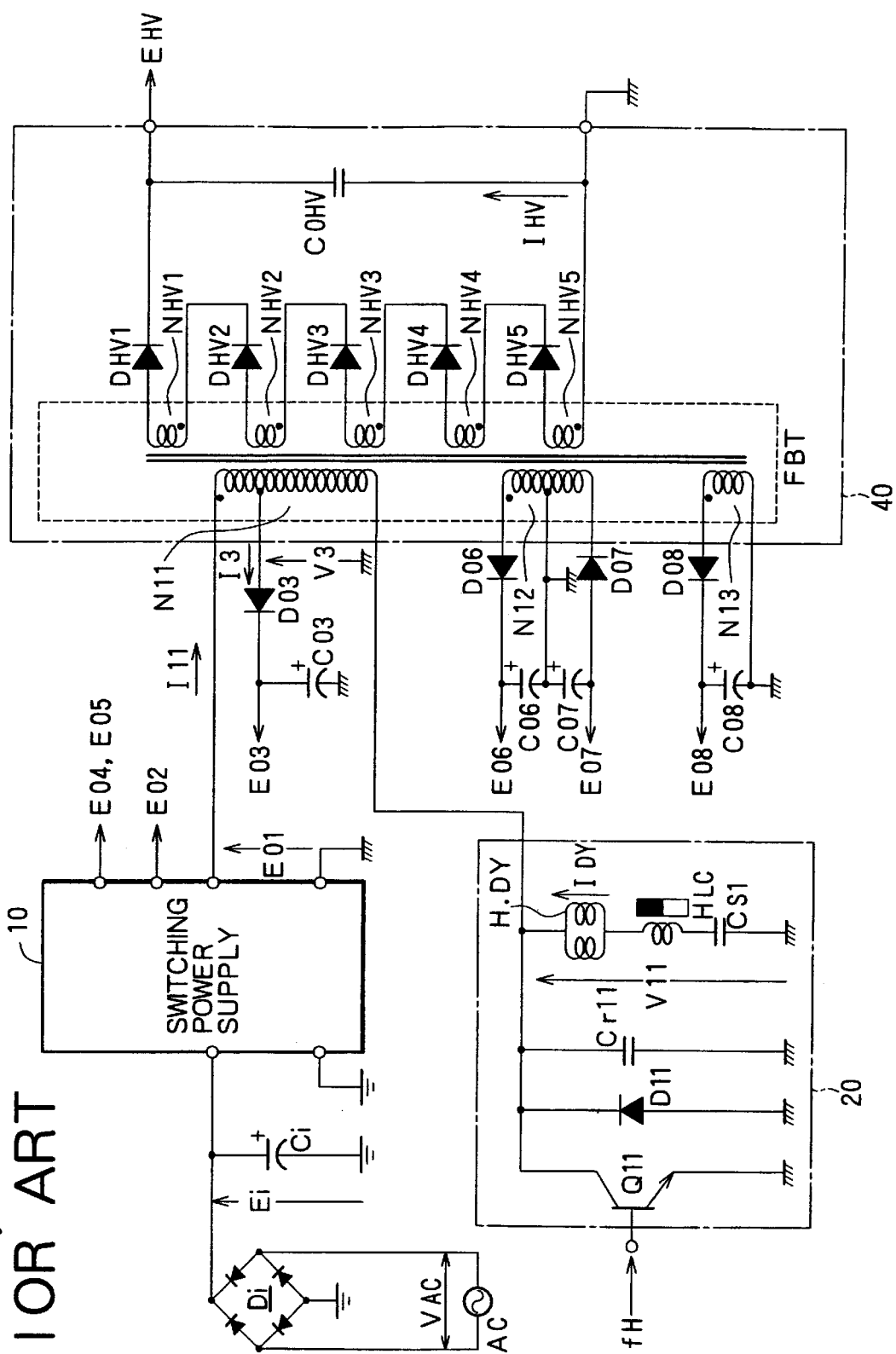
FIG. 9 shows a configuration of a conventional television power supply circuit.
Figure 10A:
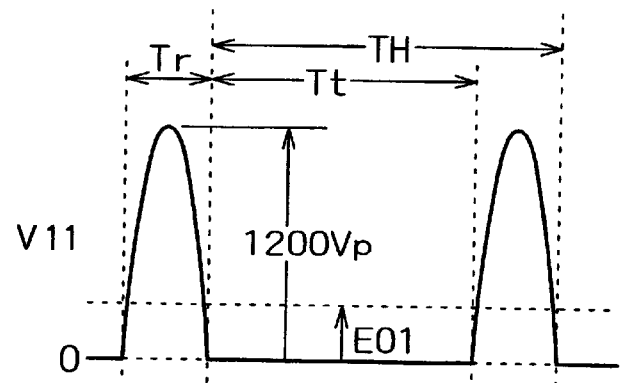
FIGS. 10A, 10B, 10C, 10D, and 10E are waveform diagrams showing operations of main parts of the television power supply circuit shown in FIG. 9.
Figure 10B:
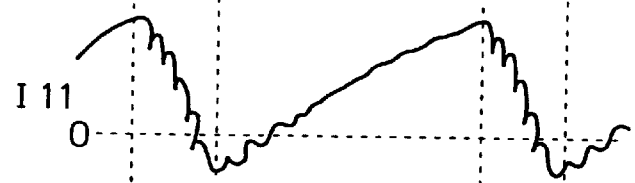
Figure 10C:
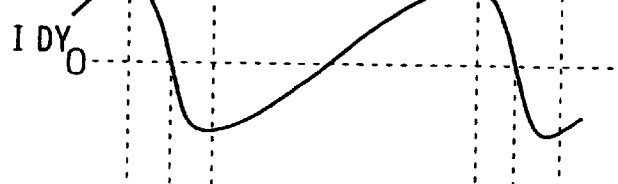
Figure 10D:
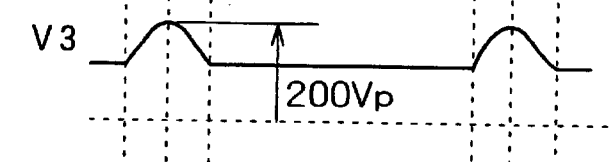
Figure 10E:
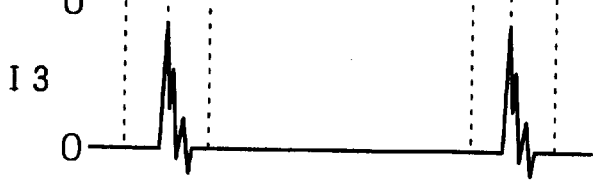

As shown by comparison of the thus configured power supply circuit of FIG. 1 with the conventional circuit shown in FIG. 9, the conventional circuit steps up the flyback pulse voltage V11 provided by the horizontal output circuit 20 and then supplies a high direct-current voltage EHV from the high-voltage generating circuit 40.

On the other hand, the circuit of FIG. 1 inputs the resonance pulse voltage V2 generated across the secondary-side parallel resonant capacitor C2 directly to the high-voltage generating circuit 4 via the series resonant capacitor C3. Thus, the high direct-current voltage EHV is obtained in the high-voltage generating circuit 4 without intervention of the horizontal output circuit 20 for converting the direct-current output voltage E01 of the switching power supply 10 into the flyback pulse voltage as in the conventional circuit shown in FIG. 9, for example.

In addition, the power supply circuit is formed by a complex resonance type switching converter provided with the parallel resonant circuit to convert switching operation into voltage resonance type operation on the primary side of the isolation converter transformer PIT and the parallel resonant circuit to provide voltage resonance operation on the secondary side.

In this case, voltage conversion efficiency ηDC-DC of the conventional circuit shown in FIG. 9 is about 85%, whereas voltage conversion efficiency ηDC-DC of the power supply circuit shown in FIG. 1 formed by the complex resonance type switching converter is improved to about 95%. Thus, the power supply circuit of FIG. 1 can reduce power loss more than the conventional circuit.

Since the power supply circuit of FIG. 1 has the series resonant circuit for converting the primary-side operation of the step-up transformer HVT into voltage resonance type operation, the resonance voltage V4 inputted to the primary-side winding N4 of the step-up transformer HVT forms a resonance voltage waveform as shown in FIG. 2E or FIG. 2K, and the voltage induced in the step-up winding NHV1 of the step-up transformer HVT also forms a resonance voltage waveform.

Hence, when the induced voltage is rectified by the high-voltage rectifier diode DHV1, the conduction angle of the high-voltage rectifier diode DHV1 is widened, and therefore equivalent power supply impedance can be lowered. Thus, it is possible to suppress variation in the level of the high direct-current voltage EHV even when the high-voltage load power is varied from 0 W to 60 w.

Figure 4:
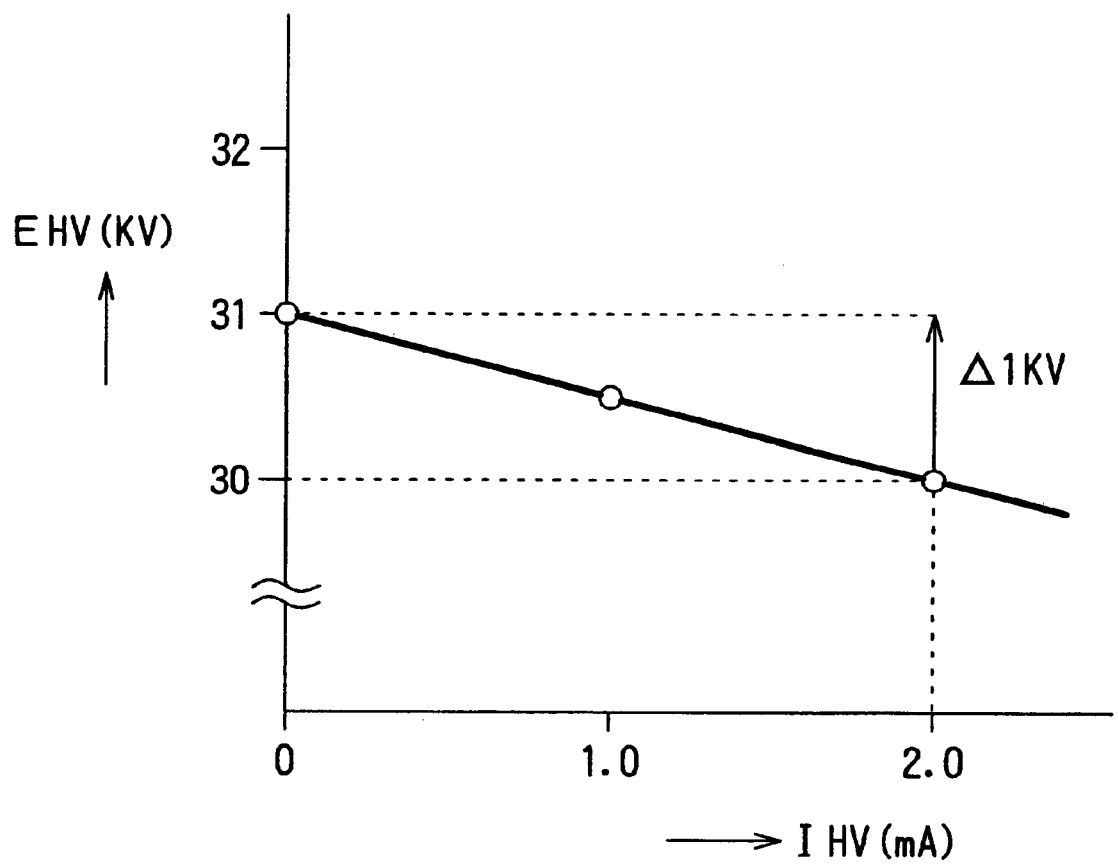
FIG. 4 shows a relation between high-voltage load power and high direct-current voltage outputted from a high-voltage generating circuit when the power supply circuit of FIG. 1 is applied to an actual television receiver.

FIG. 4 shows a relation between the high-voltage load power and the high direct-current voltage outputted from the high-voltage generating circuit when the power supply circuit of FIG. 1 is applied to an actual television receiver.

For example, when the voltage level of the high direct-current voltage EHV is 30 KV at a high-voltage load power of 60 W, the voltage level of the high direct-current voltage EHV at a high-voltage load power of 0 W is about 31 KV. Specifically, a voltage variation range ΔEHV of the high direct-current voltage EHV is 1 KV even when the high-voltage load power is varied from 60 W to 0 W. Thus, it is possible to reduce the voltage variation range to less than one-half of 2.5 KV, which is the voltage variation range of the conventional circuit of FIG. 9.

Hence, when the power supply circuit according to the present embodiment supplies the high direct-current voltage EHV to an anode of a CRT, it is possible to suppress variation in horizontal amplitude of an electron beam outputted from the CRT. Thus, no change in frame size occurs when brightness of the cathode-ray tube screen is low, and it is not necessary to provide a zooming correction circuit and the like for the horizontal output circuit of the television receiver.

In addition, the switching frequency of the step-up transformer HVT is equivalent to that of the switching device Q1, and is not in synchronism with the cycle of the horizontal synchronizing signal fH of a video signal, for example.

Accordingly, leakage flux or leakage inductance from the step-up transformer HVT does not cause ringing in the induced voltage of the step-up winding NHV1 of the step-up transformer HVT.

Thus, raster ringing is not caused on the screen of the CRT, for example. Even if ringing occurs, a ringing current component is not superimposed on the horizontal deflection current IDY because the high-voltage generating circuit 4 and a horizontal deflection circuit are formed independently of each other. The power supply circuit therefore has another advantage of being able to prevent raster ringing and a curtain pattern on the screen of the CRT.

Furthermore, while the conventional circuit of FIG. 9 requires that the number of turns of the primary-side winding N4 in the flyback transformer FBT be 73 T, it is possible to reduce the number of turns of the primary-side winding N4 in the power supply circuit of FIG. 1 to 28 T. Also, for example, the operating frequency at no load is raised to about 100 KHz. Thus, it is possible to reduce the cross-sectional area of the ferrite core of the step-up transformer HVT to about ½ of that of the conventional circuit.

It is to be noted that the power supply circuit according to the present invention is not limited to the circuit configuration shown in FIG. 1.

Figure 5:
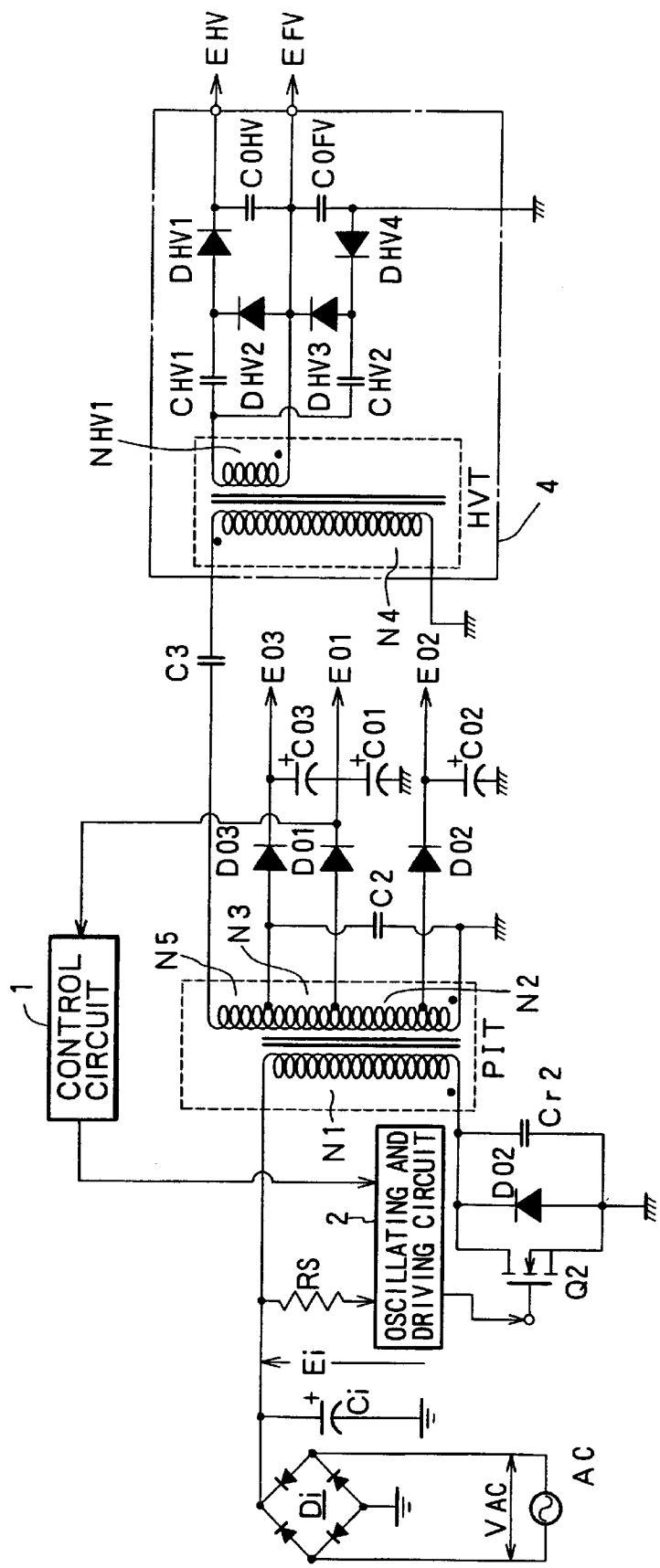
FIG. 5 shows a configuration of a power supply circuit according to a second embodiment of the present invention.

FIG. 5 shows a configuration of a power supply circuit according to a second embodiment of the present invention.

The power supply circuit shown in FIG. 5 is provided on the primary side with an externally excited voltage resonance type converter. A switching device Q2 formed by a MOS-FET, for example, is provided in the power supply circuit. A drain of the switching device Q2 is connected to a positive electrode of a smoothing capacitor Ci via a primary-side winding N1 of an isolation converter transformer PIT, while a source of the switching device Q2 is connected to a ground on the primary side. In this case, a parallel resonant capacitor cr2 is connected in parallel with the drain and source of the switching device Q2. Also, a clamp diode DD2 is connected in parallel with the drain and source of the switching device Q2.

The switching device Q2 is driven to perform switching operation as described with reference to FIG. 1 by an oscillating and driving circuit 2.

Specifically, a control circuit 1 supplies the oscillating and driving circuit 2 with a current or a voltage whose level is varied according to variation in a direct-current output voltage E01. The oscillating and driving circuit 2 outputs to a gate of the switching device Q2 a switching driving voltage whose cycle is changed according to level of the output from the control circuit 1 so as to stabilize direct-current output voltage outputted from the secondary side of the isolation converter transformer PIT. Thus, switching frequency of the switching device Q2 is changed. In changing the switching frequency of the switching device Q2, the oscillating and driving circuit 2 outputs a switching driving signal generated so that the off period of the switching device Q2 is fixed and its on period is varied, as described with reference to FIG. 1.

A starting resistance Rs is provided to supply the oscillating and driving circuit 2 with a starting current obtained in a rectifying and smoothing line at the turn-on of commercial alternating-current power.

On the secondary side of the isolation converter transformer PIT thus formed, a tertiary winding N5 is wound from an ending point of a secondary winding N3. An ending point of the tertiary winding N5 is connected to a starting point of a primary-side winding N4 of a flyback transformer FBT via a series resonant capacitor C3.

In this case, it is possible to obtain the same effects as those of the power supply circuit of FIG. 1, and additionally to raise level of a resonance voltage V4 inputted from the secondary side of the isolation converter transformer PIT to the primary-side winding N4 of the step-up transformer HVT. Therefore, a level by which the step-up transformer HVT steps up the voltage can be made lower than that of the power supply circuit shown in FIG. 1.

Thus, the power supply circuit has an advantage of being able to reduce the number of turns of a step-up winding NHV1 provided on the secondary side of the step-up transformer HVT and thereby miniaturize the flyback transformer FBT.

There are other conceivable secondary-side circuit configurations for the power supply circuits according to the embodiments described thus far.

Figure 6:
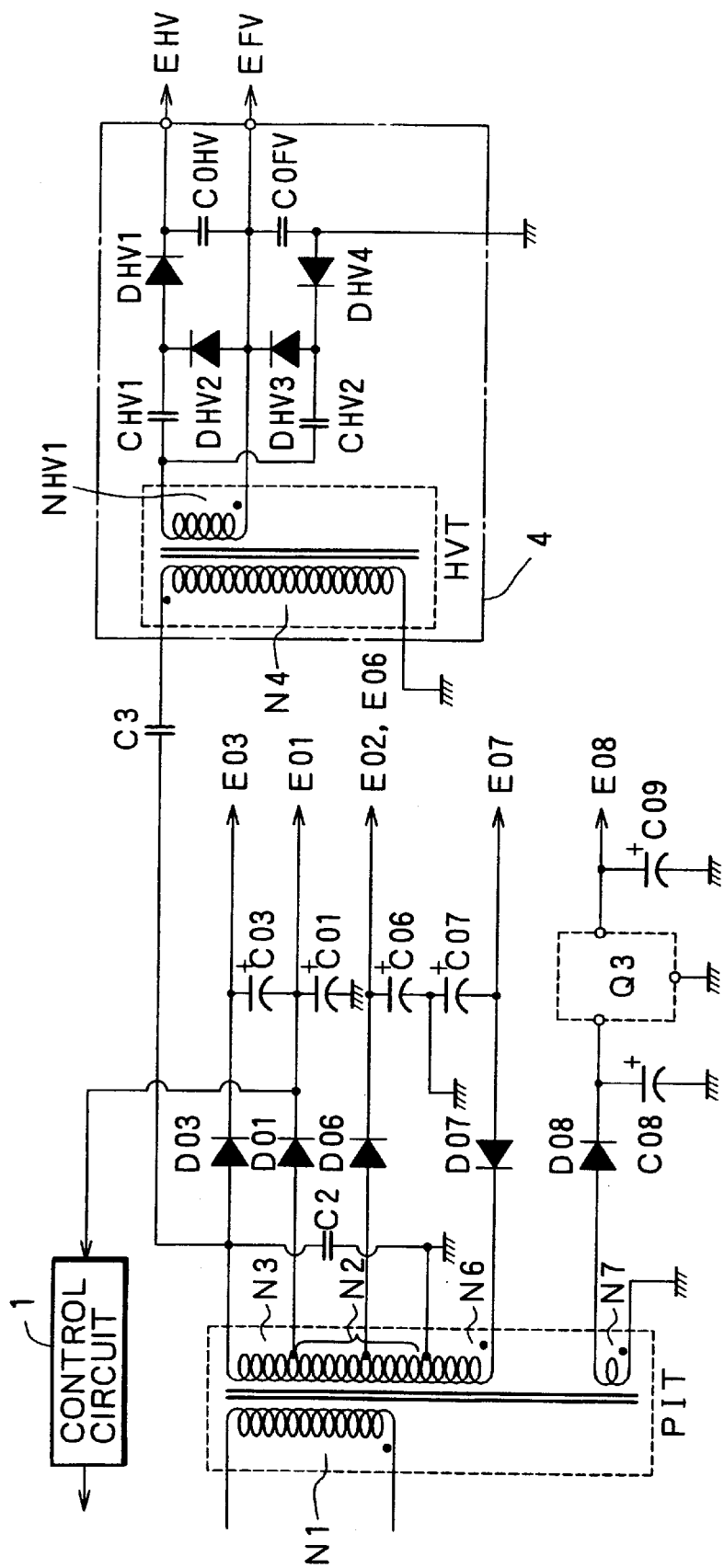
FIG. 6 shows another secondary-side circuit configuration applicable to the power supply circuits according to the embodiments.

FIG. 6 shows another secondary-side circuit configuration for the power supply circuits according to the embodiments described thus far.

The power supply circuit shown in FIG. 6 may employ either the self-excited voltage resonance converter shown in FIG. 1 or the externally excited voltage resonance converter shown in FIG. 5 as a primary-side circuit configuration. The same parts as in FIG. 1 are identified by the same reference numerals, and their description will be omitted.

As in FIG. 1, on the secondary side of an isolation converter transformer PIT shown in FIG. 6, a tertiary winding N3 is formed by winding a wire from an ending point of a secondary winding N2. In this case, a tap is provided to the secondary winding N2. A rectifier diode D06 and a smoothing capacitor C06 rectify and smooth an output obtained from the tap to thereby provide a direct-current output voltage E02 for a signal circuit and a direct-current output voltage E06 (+15 V) for a vertical deflection circuit, for example.

Also, in this case, an ending point of a tertiary winding (fourth secondary-side winding) N6 is connected to a starting point of the secondary winding N2. A rectifier diode D07 and a smoothing capacitor C07 rectify and smooth an output obtained from the tertiary winding N6 to thereby provide a direct-current output voltage E07 (−15 V) for the vertical deflection circuit.

Furthermore, the power supply circuit has an independent tertiary winding N7 wound on the secondary side of the isolation converter transformer PIT in the same polarity direction as a primary-side winding N1. In this case, a starting point of the tertiary winding N7 is connected to a ground on the secondary side, while an ending point of the tertiary winding N7 is connected to an anode of a rectifier diode D08. The rectifier diode D08 and a smoothing capacitor C08 rectify and smooth an output obtained from the tertiary winding N7, and then a three-terminal regulator Q3 or the like renders the direct-current output voltage constant and charges a smoothing capacitor C09 with the constant voltage. A direct-current output voltage E08 (6.3 V) for a heater, for example, is thereby obtained from across the smoothing capacitor C09.

With such a configuration, a direct-current output voltage E03 for a video output circuit as well as the direct-current output voltages E06 and E07 (±15 V)/7 W for the vertical deflection circuit, and the direct-current output voltage E08 (6.3 V)/4 W for the heater, which the conventional circuit obtains from the primary side of the flyback transformer FBT, can be obtained from the secondary side of the isolation converter transformer PIT.

As a result, since the voltage conversion efficiency ηDC-DC of the conventional circuit applied to for example a 34-inch television receiver is about 85%, the conventional circuit requires a direct-current input power of 24.7 W (21 W÷0.85) for the flyback transformer FBT to provide the direct-current output voltage E03 (200 V)/10 W for the video output circuit, the direct-current output voltages E06 and E07 (±15 V)/7 W for the vertical deflection circuit, and the direct-current output voltage E08 (6.3 V)/4 W for the heater.

On the other hand, the switching converter provided in the power supply circuit shown in FIG. 6 is of the complex resonance type, and the power conversion efficiency ηDC-DC of the power supply circuit is improved to about 95%. Therefore, when the power supply circuit shown in FIG. 6 is applied to a 34-inch television receiver to supply the direct-current output voltages E03, E06, E07, and E08 from the secondary side of the isolation converter transformer PIT, the power supply circuit requires a direct-current input power of only 22.1 W (21 W÷0.95), thus making it possible to reduce power loss by about 2.6 W.

As a result, the power supply circuit shown in FIG. 6 makes it possible to reduce the direct-current input power by about 14 W as compared with the conventional circuit shown in FIG. 9.

Furthermore, the AC-DC power conversion efficiency ηAC-DC of the current resonance type converter forming the switching power supply 10 in the conventional circuit of FIG. 9 is about 90%, and therefore when the maximum load power (Pomax) totaling the direct-current output voltages E01, E02, E04, and E05 is 200 W, the alternating-current input power becomes 222.2 W.

On the other hand, the power supply circuit shown in FIG. 6 improves its AC-DC power conversion efficiency ηAC-DC, and thus makes it possible to reduce the alternating-current input power by about 18 W and thereby conserve energy.

While a preferred embodiment of the present invention has been described using specific terms, such description is for illustrative purposes only, and it is to be understood that changes and variations may be made without departing from the spirit or scope of the following claims.

What is claimed is:

1. A switching power supply circuit comprising:
    switching means including a switching device for interrupting a direct-current input voltage inputted thereto and producing a switched output;
    an isolation converter transformer for coupling the switched output fed to a primary side thereof to a secondary side thereof, the isolation converter transformer including a primary-side winding wound on the primary side and a secondary-side winding wound on the secondary side, and the isolation converter transformer having a predetermined degree of coupling to loosely couple said primary-side winding and said secondary-side winding to each other;
    a primary-side parallel resonant circuit formed by connecting a primary-side parallel resonant capacitor in parallel with the primary-side winding of said isolation converter transformer for converting operation of said switching means into voltage resonance type operation;

a secondary-side parallel resonant circuit formed by connecting a secondary-side parallel resonant capacitor in parallel to said secondary-side winding;

a step-up transformer for coupling a resonance voltage fed to a primary side thereof to a secondary side thereof and thereby supplying from the secondary side a stepped-up voltage obtained by stepping up the resonance voltage, the step-up transformer including a primary-side winding wound on the primary side and a secondary-side winding wound on the secondary side;

a series resonant capacitor connected between the secondary-side winding of said isolation converter transformer and the primary-side winding of said step-up transformer for converting primary-side operation of said step-up transformer into a resonance operation, the series resonant capacitor inputting the resonance voltage obtained from the secondary-side winding of said isolation converter transformer to the primary side of said step-up transformer; and high direct-current voltage generating means for performing rectifying operation on the stepped-up voltage obtained on the secondary side of said step-up transformer and thereby providing a high direct-current voltage.

2. The switching power supply circuit as claimed in claim 1, wherein the secondary side of said isolation converter transformer has at least a portion of a first secondary-side winding and a portion of a second secondary-side winding formed by winding a wire of the first secondary-side winding;

and said high direct-current voltage generating means provides a first direct-current output voltage by performing a half-wave rectifying operation on an alternating voltage obtained from said first secondary-side winding and provides a second direct-current output voltage by accumulating, on the first direct-current output voltage, a direct-current output voltage obtained by performing a half-wave rectifying operation on an alternating voltage obtained from said second secondary-side winding.

3. The switching power supply circuit as claimed in claim 1, wherein said high direct-current voltage generating means outputs a first high direct-current voltage having a predetermined high voltage level and a second high direct-current voltage having a voltage level lower than that of the first high direct-current voltage.

4. The switching power supply circuit as claimed in claim 1, wherein a third secondary-side winding is formed by winding a wire from an ending point of the second secondary-side winding of said isolation converter transformer, and the primary-side winding of said step-up transformer is connected between the third secondary-side winding and a secondary-side ground via said series resonant capacitor.

5. The switching power supply circuit as claimed in claim 1, said switching power supply circuit further comprising:

direct-current output voltage generating means for providing a direct-current output voltage by performing rectifying operation on an alternating voltage obtained from said secondary-side winding, the direct-current output voltage generating means including said secondary-side parallel resonant circuit;

constant-voltage control means for effecting control for constant voltage by driving said switching device for switching operation in such a manner that switching frequency of said switching device is variably controlled according to a level of said direct-current output voltage, wherein an off period of said switching device within a switching cycle is fixed and an on period of said switching device is changed.

6. The switching power supply circuit as claimed in claim 5, wherein said constant-voltage control means comprises a control transformer including a detecting winding, a driving winding, and a control winding; and wherein the detecting winding is connected in series with the primary-side winding of said isolation converter transformer, whereby said switching device is driven for switching operation by an output of said switching means induced in the driving winding, while control for constant voltage is effected by controlling the driving winding based of a voltage applied to the control winding according to a level of said direct-current output voltage.

* * * * *